United States Patent [19]

Lat

[11] 4,430,367

[45] Feb. 7, 1984

[54] TRANSLUCENT STAINABLE COATING

[75] Inventor: Geronimo E. Lat, Skokie, Ill.

[73] Assignee: United States Gypsum Company, Chicago, Ill.

[21] Appl. No.: 504,077

[22] Filed: Jun. 15, 1983

Related U.S. Application Data

[63] Continuation-in-part of Ser. No. 338,770, Jan. 11, 1982, abandoned.

[51] Int. Cl.³ .................... C08K 3/26; C08K 3/32
[52] U.S. Cl. ........................ 427/388.4; 523/171;
523/200; 427/393.5; 524/417; 524/423;
524/425; 524/560; 524/561
[58] Field of Search ............. 523/200, 171; 524/417,
524/425, 560, 561, 423, 507; 427/388.4, 393.5

[56] References Cited

U.S. PATENT DOCUMENTS

| | | | |
|---|---|---|---|
| 2,671,738 | 3/1954 | Klohs | 523/171 |
| 4,085,246 | 4/1978 | Buser et al. | 428/220 |
| 4,094,853 | 6/1978 | Monte et al. | 523/220 |
| 4,097,639 | 6/1978 | Millar | 428/220 |
| 4,137,215 | 1/1979 | Gasse | 524/425 |
| 4,175,066 | 11/1979 | Shibazaki et al. | 524/425 |
| 4,329,386 | 5/1982 | Samowich | 428/202 |
| 4,345,044 | 8/1982 | Columbus et al. | 524/425 |
| 4,361,382 | 11/1982 | Miyoshi et al. | 350/126 |
| 4,367,171 | 1/1983 | Leifels et al. | 524/425 |

FOREIGN PATENT DOCUMENTS

| | | | |
|---|---|---|---|
| 1469991 | 11/1969 | Fed. Rep. of Germany | 523/171 |
| 1162227 | 8/1969 | United Kingdom | 523/171 |

OTHER PUBLICATIONS

Derwent Abs. 01800c/02 (PT2826654) 1-80.
Derwent Abs. 56169d/31 (J56072920) 6-81.

*Primary Examiner*—Melvyn I. Marquis
*Assistant Examiner*—Herbert J. Lilling
*Attorney, Agent, or Firm*—Samuel Kurlandsky; Robert H. Robinson; Kenneth E. Roberts

[57] ABSTRACT

Substrates such as metal, plastic, hardboard and plywood may be coated with a translucent film of a filled acrylic resin so that a decorative stain may be applied. The filler in the acrylic resin is an extender pigment having a mean particle size of from about 5 to about 7 microns.

17 Claims, No Drawings

TRANSLUCENT STAINABLE COATING

This application is a continuation-in-part, of application Ser. No. 338,770, filed 1-11/82, now abandoned.

This invention relates to a translucent, stain absorbent film which is applied as a coating of a filled acrylic latex to a substrate such as a metal or a plastic. It further relates to a method for imparting stainability to such a substrate. More particularly, the invention relates to an aqueous, film-forming composition comprising an acrylic latex and a soft, water-insoluble extender pigment.

The translucent film of this invention is distinguished from a transparent one in that it is slightly opaque, permitting the imperfect transmission of light reflected from the substrate. The film is capable of absorbing an applied stain while still exposing the color and markings of the substrate.

In the past, coatings intended as stainable base coats generally were pigmented so that an opaque film would be formed on the substrate. Ground coats of this sort are used in the inventions described in U.S. Pat. Nos. 1,651,136; 2,248,254; 3,811,915; and 3,847,646. A method for producing a "crackled" antique finish is described in U.S. Pat. No. 3,692,557. Said method utilizes a composition comprising an acrylic resin emulsion, finely ground marble, polyurethane, and water. The composition may be applied as both the first and third coatings on a substrate, the second coating being a water soluble dye, or, in the case where the substrate is non-absorbent, the water soluble dye is applied first and the acrylic/polyurethane emulsion is applied over the dried dye. In either case, the water soluble dye is said to "bleed through" upwards into the third or uppermost coating to form the antique looking finish having a cracked surface.

Now, it has been discovered that a substantially colorless, translucent film capable of absorbing an applied stain may be formed on a substrate by coating the substrate with an aqueous composition comprising an acrylic latex and a water-insoluble extender pigment having a mean particle size of from about 5 to about 7 microns, then drying said coating by a suitable method.

It is an object of this invention to provide a stainable acrylic film.

It is another object of this invention to provide a stainable film for substrates which would not otherwise absorb a decorative stain evenly.

It is another object of this invention to provide a stainable film for substrates which do not absorb water-based coating compositions.

It is a related object of this invention to provide an aqueous composition for coating water impervious substrates so that an aqueous stain may be used to decorate such substrates.

It is a further object of this invention to provide a stainable translucent film through which a base color on the substrate is visible.

It is yet another object of this invention to provide a stainable film having a high impact strength.

It is a related object of this invention to provide a stainable film for metal surfaces.

It is another related object of this invention to provide a stainable film having excellent adhesive strength.

It is still further an object of this invention to provide a method for coating a non-absorbent substrate so that a decorative stain may be absorbed.

These and other objects which will become apparent are achieved by the aqueous composition, translucent film, and method for applying them which is described below.

The acrylic latices used in this invention are aqueous emulsions of acrylic resins; the emulsions have a solids content of from about 30% to about 45% by weight. The resins constitute substantially all of the solids present. Homopolymers and copolymers of alkyl acrylates and methacrylates and copolymers of such monomers with acrylonitrile, acrylic and methacrylic acids, styrene, and similar vinyl monomers are examples of the acrylic resins which are useful as the film forming constituents of the composition of this invention. The term "alkyl" is used herein to mean an alkyl group having from 1 to 8 carbon atoms. Acrylates and methacrylates in which the alkyl group contains from 1 to 3 carbon atoms are preferred. Copolymers of such esters with each other and/or with one or more of the monomers specifically mentioned above are particularly preferred. The films deposited by the acrylic latices useful in this invention are generally characterized by good resistance to water, high humidity, salt spray, oil and solvents.

The aqueous composition of this invention comprises from about 10% to about 15% of the acrylic resin by weight. Water constitutes from about 10% to about 40% of the weight of the composition; this includes water in the acrylic latex and added water.

The size of the extender pigment particles is critical. Although a mean particle size of from about 5 to about 7 microns is generally acceptable, it is preferred that it be no greater than about 6 microns. A maximum particle size of about 25 microns is also preferable. It is also important that the extender pigment be a soft material, i.e., one having a hardness on the Moh scale of about 4 or less. Materials such as calcium carbonate, zinc phosphate and barium sulfate are examples of the water-insoluble, soft extender pigments useful in this invention. Particularly useful are a zinc phosphate having an average particle size of about 6 microns and calcium carbonate having a mean particle size of about 5.5 microns.

The weight ratio of extender pigment to acrylic resin ranges from about 1.5:1 to about 3.6:1. A preferred ratio is from about 2.5 to about 3.6. The amount of extender pigment in the aqueous composition is from about 15% to about 50%, preferably from about 25% on up.

The viscosity of the aqueous compositions containing such large amounts of extender pigment is reduced by titanate coupling agents such as those described in U.S. Pat. Nos. 4,069,192; 4,080,353; 4,087,402; 4,094,853; 4,098,758; and 4,122,062, which are incorporated herein. Examples of such coupling agents include isopropyl triisostearyl titanate, titanium di-(dioctylpyrophosphate) oxyacetate, and di-(dioctylpyrophosphato) ethylene titanate. Quarternary ammonium salts of those titanate coupling agents having an acidic function are particularly useful and are preferred components of the compositions of this invention. Especially preferred are the quaternary ammonium salts of 2-dimethylamino methyl propanol with either titanium di-(dioctylpyrophosphate) oxyacetate or di-(dioctylpyrophosphato) ethylene titanate.

The aqueous composition of this invention contains from about 0.25% to about 0.75% of the titanate coupling agent, based on the weight of the extender pigment. A preferred amount is from about 0.3% to about 0.5%.

Water soluble solvents such as ethylene glycol, propylene glycol, isopropanol, butyl cellosolve and the like may be added to the aqueous composition in order to improve sprayability of the composition and to regulate the drying time during film formation. The amounts used will depend on the nature and amounts of the other components and the desired drying time but such solvents usually constitute from about 4% to about 10% of the total weight of the aqueous composition. Mixtures of the solvents are especially useful for the purposes.

The viscosity of the aqueous compositions may be adjusted as desired by the addition of cellulosic thickeners such as the methylcellulose ethers, e.g. hydroxypropyl methylcellulose, and carboxymethyl cellulose. Crosslinked acrylic or methacrylic acid copolymer emulsions also function as thickeners when activated by a base such as ammonium hydroxide. From about 0.1% to about 0.5% by weight of the aqueous composition is a generally sufficient amount of thickener.

Non-ionic surfactants and/or silicones may be used in minor amounts to control foaming of the aqueous composition during its preparation.

The aqueous composition of this invention may be sprayed, roller-coated or applied by any other suitable means to the substrate. The stainable film is formed upon drying of the aqueous coating at a temperature ranging from just above the freezing point of the composition to just below its decomposition temperature but it is preferably from room temperature to about 350° F. (about 177° C.). The initial drying period includes a "flash off" time. At 160° F., an especially preferred temperature, the film is sufficiently dry after about 10 to 15 minutes; the drying time will be correspondingly longer at lower temperatures and shorter at higher temperatures. Film thickness is usually from about 0.5 to about 1 mil after drying but it may be greater if desired. An appropriate amount of the aqueous composition must, of course, be applied to obtain a film of the desired thickness.

The stainable film of this invention accepts a decorative stain evenly much like wood does. Staining of the film may be accomplished without runs even when the surface of the substrate is vertical.

Water-based, alkyd, and oil-based stains are readily absorbed by the stainable film of this invention.

The advantages of this invention are more pronounced when non-absorbent, i.e. water impervious, substrates such as metal or plastic are to be decorated by staining but substrates such as hardboard, particle board, plasterboard, and plywood may also be coated with the stainable film of this invention in order to prepare them for decorative staining.

The invention is illustrated more specifically by the following examples wherein all parts are by weight unless otherwise stated. The scope of the invention is not restricted to the specific details of these examples.

EXAMPLE 1

A mixture of water (66 parts), an anti-foaming agent comprising a non-ionic surfactant and a silicone sold under the trademark NOPCO NXZ (0.2 part), ethylene glycol (8 parts), the quaternary ammonium salt of 2-dimethylamino methyl propanol and di(dioctylpyrophosphato) ethylene titanate (1.2 parts), zinc phosphate having an average particle size of 6 microns and sold under the product designation J0852 by Mineral Pigments Corporation (175 parts) is dispersed at high speed in a Cowles mixer for 10 minutes. Then 120 parts of an acrylic latex having a solids content of about 43% by weight, a pH of 9.4 to 10, a viscosity at 25° C. of from 500 to 2000 cps. and wherein the particle size of the all-acrylic resin is less than 0.1 micron is added along with 15 parts of isopropanol and 2 parts of a crosslinked, acidic acrylic emulsion copolymer as a thickening agent. Ammonium hydroxide (3 parts) is added to activate the thickening agent. The mixture is thoroughly blended at room temperature. The acrylic latex is sold under the trademark Rhoplex MV-23 by Rohm & Haas.

A stainable film having a porous surface resulted when the composition thus prepared was applied to a substrate and dried.

EXAMPLE 2

The general procedure of Example 1 is repeated except that the acrylic latex used is an aqueous emulsion of an acrylic/styrene copolymer sold by Polyvinyl Chemical Industries under the trademark Neocryl A-623 and 10 parts of butyl cellosolve are used in addition to the ethylene glycol. The acrylic latex has a solids content of 35% by weight, a pH of 7.5, and a Brookfield viscosity at 25° C. of 320 cps.

This composition also provided a stainable, porous film when applied to a substrate and dried.

In contrast to the results of Examples 1 and 2, compositions prepared by the general procedure of Example 2 but substituting an equal weight of a finely divided silica (Imsil A-10, sold by Illinois Mineral Co.), or terra alba (finely divided gypsum), or a finely divided clay for the zinc phosphate give films having a sealed surface that do not accept a decorative stain.

EXAMPLE 3

A mixture of 150 parts of water, 18 parts of ethylene glycol, 1.7 parts of the titanate coupling agent of Examples 1 and 2, 22 parts of butyl cellosolve and 350 parts of calcium carbonate having a mean particle size of 5.5 microns (sold under the trademark Snowflake White by Thompson, Weinman and Company) is ground at high speed in a Cowles mixer. Then, 115 parts of water; 0.5 part of an anti-foaming agent; 120 parts of an acrylic latex comprising a low molecular weight terpolymer of a lower alkyl acrylate, acrylonitrile and styrene and having a solids content of about 41% by weight, a Brookfield viscosity of from 500 to 2000 cps. and a pH of 7.5; 120 parts of the acrylic latex of Example 1, 2 parts of a cellulosic thickener, and 8 parts of propylene glycol are added and the mixture is thoroughly blended at room temperature.

The composition thus prepared is sprayed onto several metal panels having a primer coat in place. A film having a thickness of 1 mil (about 25 microns) is formed after drying at 160° F. (about 70° C.) for 12 minutes with 10 minutes of flash off time.

A commercial stain is then spread on each panel and wiped in the conventional manner. The stains used are Formby's gelled stain, Cuprinol stain and wood preservative, Pratt & Lambert Penetrating Rustic Stain, Olympic (linseed oil base), Enterprise 2-in-1, Carver Tripps, and Minwax stain. Excellent stain reception is achieved in each case. The impact strength and adhesion of the film is excellent.

EXAMPLE 4

The general procedure of Example 3 is repeated except that zinc phosphate having an average particle size of 6 microns is used in place of the calcium carbonate.

The film deposited on metal panels by the aqueous composition thus prepared also showed excellent stainability, impact strength and adhesion.

In contrast to the results of Examples 3 and 4, a film deposited from a composition prepared by the general procedure of Example 4 except for the replacement of 300 parts of the zinc phosphate by a calcium carbonate having a mean particle size of 2.5 microns showed poor stain reception.

What is claimed is:

1. An aqueous composition for forming a translucent, stain absorbent film, said composition comprising an acrylic latex containing from about 8% to about 15% of an acrylic resin based on the total weight of the composition, and from about 11% to about 50% of a water-insoluble extender pigment having a mean particle size of from about 5 to about 7 microns and a Moh hardness of about 4 or less.

2. The composition of claim 1 wherein the weight ratio of said pigment to the acrylic resin is from about 1.5:1 to about 3.6:1.

3. The composition of claim 1 further comprising a titanate coupling agent in an amount of from about 0.25% to about 0.75% of the weight of the extender pigment.

4. The composition of claim 1 wherein the extender pigment is at least one of the class consisting of calcium carbonate and zinc phosphate.

5. An aqueous composition for forming a translucent, stainable film, said composition comprising, by weight, from about 8% to about 15% of an acrylic resin, from 0% to about 7% polyurethane, from 0% to about 4% N-methyl-2-pyrrolidone, from about 10% to about 45% water, and from about 11% to about 50% extender pigment having a mean particle size of from about 5 to about 7 microns and a Moh hardness of about 4 or less.

6. The composition of claim 5 wherein the acrylic resin is from about 10% to about 15%, water is from about 10% to about 40%, the extender pigment is from about 15% to about 50%, and the polyurethane and the N-methyl-2-pyrrolidone are 0% of its weight.

7. The composition of claim 5 wherein the polyurethane is from about 1.4% to about 7% of its weight.

8. The composition of claim 7 wherein the N-methyl-2-pyrrolidone is from about 0.6% to about 3.8% of its weight.

9. The composition of claim 8 wherein the polyurethane is from about 3.9% to about 6% of its weight.

10. A translucent, stainable coating comprising from about 8.9% to about 27% of an acrylic resin and a water-insoluble extender pigment having a mean particle size of from about 5 to about 7 microns and a Moh hardness of about 4 or less, and the weight ratio of extender pigment to acrylic resin is from about 1.5:1 to about 3.6:1.

11. The coating of claim 10 wherein the extender pigment is at least one of the class consisting of calcium carbonate and zinc phosphate.

12. The coating of claim 10 further comprising a polyurethane.

13. The coating of claim 12 wherein the weight ratio of acrylic resin to polyurethane is from about 1.3:1 to about 3.7:1.

14. The coating of claim 12 wherein the weight ratio of extender pigment to the binder is from about 1.5:1 to about 2:1.

15. A method for imparting stainability to a non-absorbent substrate, said method comprising coating said substrate with an aqueous dispersion of from about 8% to about 15% of an acrylic resin and an extender pigment having a mean particle size of from about 5 to about 7 microns and a Moh hardness of about 4 or less, the ratio of extender pigment to acrylic resin being from about 1.5:1 to about 3.6:1.

16. The method of claim 15 wherein the aqueous dispersion also contains a polyurethane.

17. The method of claim 15 wherein the extender pigment is at least one of the class consisting of calcium carbonate and zinc phosphate.

* * * * *

UNITED STATES PATENT AND TRADEMARK OFFICE
CERTIFICATE OF CORRECTION

PATENT NO. : 4,430,367  Page 1 of 3
DATED : February 7, 1984
INVENTOR(S) : Geronimo E. Lat It is certified that error appears in the above—identified patent and that said Letters Patent is hereby corrected as shown below:

Column 1, after line 63, insert the paragraph:

--It is a further related object of this invention to provide a stainable film for extruded plastic articles having a waxy surface.--

Column 2, after line 24, insert the paragraph:

--In some instances, a polyurethane dispersion containing N-methyl-2-pyrrolidone may be added to enhance the adhesive properties of the composition and to improve the surface properties of the film. This is especially useful when previously uncoated plastic articles are to be coated with the stainable film of this invention.--

Column 2, delete the paragraph beginning at line 25, and insert the paragraphs:

--The aqueous composition of this invention comprises, by weight, from about 8 to about 15% of the acrylic resin, from 0 to about 7% polyurethane, from 0 to about 4% N-methyl-2-pyrrolidone, from about 10% to about 45% water, and from about 11% to about 50% of an extender pigment. Thickeners, coupling agents, and other water-soluble solvents may be present, also.

When the polyurethane dispersion is not used, the aqueous composition comprises from about 10% to about 15% acrylic resin, from about 10% to about 40% water, and from about 15% to about 50% extender pigment, all based on the total weight of the composition. The sources of the water include the acrylic latex, added water and, when used, the polyurethane dispersion.--

Column 2, lines 47 and 48, after "is" and before "preferably", delete "from about 15% to about 50%," and afer "up.", insert --The weight ratio of the extender pigment to the binder, including acrylic resin and the polyurethane, is from about 1.5:1 to about 2:1.--

UNITED STATES PATENT AND TRADEMARK OFFICE
CERTIFICATE OF CORRECTION

PATENT NO. : 4,430,367

DATED : February 7, 1984

INVENTOR(S) : Geronimo E. Lat

It is certified that error appears in the above—identified patent and that said Letters Patent is hereby corrected as shown below:

Column 3, line 10, change "4%" to --3%--; after line 24: insert the paragraph;

--The polyurethane dispersion may be added to a mixture of the acrylic latex, water, extender, and other ingredients mentioned above. The amount added may be from about 5% to about 30% of the weight of the mixture to which it is added. The resulting composition will thus contain from about 8% to about 14.3% acrylic resin, from about 11.9% to about 44% water, from about 11.5% to about 47.6% extender pigment, from about 1.4% to about 7% polyurethane, and from about 0.6% to about 3.8% of the N-methyl-2-pyrrolidone. Preferred compositions contain from about 3.9% to about 6% polyurethane and proportional amounts of the N-methyl-2-pyrrolidone.--

Column 5, after line 14, insert:

--Example 5

A mixture of an acrylic latex, water, and calcium carbonate was prepared according to the general procedure of Example 3. To one hundred (100) parts of this mixture at room temperature there were added with good agitation twenty (20) parts of an anionic colloidal dispersion of polyurethane (sold under the trademark Spensol L-51 by Spencer Kellog) which contains 30% solids and about 17% N-methyl-2-pyrrolidone. The resulting composition was sprayed promptly onto an uncoated piece of extruded cellular PVC moulding and placed in a drying oven at 190°F for 30 seconds to produce a film 1 mil thick on the moulding. Adhesion of the film was excellent. Staining of the film by wiping with a stain-filled cloth and then a dry cloth gave an excellent wood-like appearance.

UNITED STATES PATENT AND TRADEMARK OFFICE
CERTIFICATE OF CORRECTION

PATENT NO. : 4,430,367              Page 3 of 3

DATED : February 7, 1984

INVENTOR(S) : Geronimo E. Lat

It is certified that error appears in the above—identified patent and that said Letters Patent is hereby corrected as shown below:

Example 6

Additional samples of the PVC moulding were coated with a stainable coating prepared essentially like that of Example 5 and were stained with eleven commercially available stains by the wiping method. Four of the stains were latex-based and seven were oil-based. Good results were obtained in each case.--

Signed and Sealed this

Twenty-fifth Day of September 1984

[SEAL]

Attest:

GERALD J. MOSSINGHOFF

Attesting Officer       Commissioner of Patents and Trademarks